United States Patent [19]

Shindo

[11] Patent Number: 5,105,182
[45] Date of Patent: Apr. 14, 1992

[54] DIRECT CURRENT POWER SUPPLY DEVICE HAVING AN ALARM PROVIDED FOR POWER FAILURE UNDER VARYING LOAD CONDITIONS

[75] Inventor: Kenji Shindo, Aichi, Japan
[73] Assignee: Mitsubishi Denki K.K., Tokyo, Japan
[21] Appl. No.: 644,795
[22] Filed: Jan. 23, 1991
[51] Int. Cl.⁵ .................. G08B 21/00; H02H 7/125
[52] U.S. Cl. ............................ 340/663; 340/664; 340/654; 363/53; 361/89
[58] Field of Search ............... 363/52, 53; 340/660, 340/661, 662, 663, 654, 656, 664; 361/83, 89, 94; 307/296.1, 296.4, 362

[56] References Cited

U.S. PATENT DOCUMENTS

| | | | |
|---|---|---|---|
| 3,918,043 | 11/1975 | Beck | 340/663 |
| 4,065,676 | 12/1977 | Elias | 307/66 |
| 4,213,165 | 7/1980 | Zylstra et al. | 361/94 |
| 4,223,307 | 9/1980 | Albritton | 340/656 |
| 4,266,259 | 5/1981 | Howell | 361/97 |
| 4,331,996 | 5/1982 | Matsko et al. | 361/92 |
| 4,486,803 | 12/1984 | Zylstra | 361/95 |
| 4,847,725 | 7/1989 | Ishii | 361/96 |
| 4,862,312 | 8/1989 | Ishii | 361/96 |
| 4,873,603 | 10/1989 | Ishii | 361/96 |
| 4,956,563 | 9/1990 | Schornack | 307/66 |

Primary Examiner—Steven L. Stephan
Assistant Examiner—Ben Davidson
Attorney, Agent, or Firm—Sughrue, Mion, Zinn, Macpeak & Seas

[57] ABSTRACT

A direct current power supply device which generates an alarm signal when a power failure occurs in an alternating current power supply connected as an input to the device. A power failure detector circuit is connected at the input of the device and signals the failure of the AC power supply. In order to compensate for different time delays in the fall of the DC output due to varying loads at the output of the device, a reset signal generating circuit is used which is controllable in accordance with the size of the load. The circuit receives as an input, a signal identifying a power failure from the power failure detector circuit and a signal identifying the load current value from a load current value detector circuit, connected between the load and the AC/DC converter. The reset signal generating circuit, using analog or digital components, will generate a reset signal at a timing determined by the size of the load.

13 Claims, 6 Drawing Sheets

| A | CONDITION | | 1 | 2 | 3 | 4 | 5 | 6 | 7 |
|---|---|---|---|---|---|---|---|---|---|
| B | CONSUMED CURRENT | | SMALL → | | | | | | LARGE |
| C | 10 IN DATA | | 00~3F | 40~5F | 60~7F | 80~9F | A0~BF | C0~DF | E0~FF/EE |
| D | 34 OUT NO. DATA | | 01 | 02 | 03 | 04 | 05 | 06 | 07 |
| | | D2 | 0 | 0 | 1 | 0 | 1 | 1 | 1 |
| | | D1 | 0 | 1 | 0 | 1 | 0 | 1 | 1 |
| | | D0 | 1 | 0 | 0 | 1 | 1 | 0 | 1 |
| E | CONDITION OF RESISTOR | | R1 | R2 | R3 | R1//R2 | R1//R3 | R2//R3 | R1//R2//R3 |
| F | DELAY OF RESET SIGNAL | | LONG → | | | | | | SHORT |

DIRECT CURRENT POWER SUPPLY DEVICE HAVING AN ALARM PROVIDED FOR POWER FAILURE UNDER VARYING LOAD CONDITIONS

BACKGROUND OF THE INVENTION

1. Field Of The Invention

The present invention relates to a direct current power supply device which generates an alarm signal when a power failure occurs in an alternating current power supply connected to an input side thereof.

2. Description Of The Prior Art

FIG. 4 is a block diagram illustrating a direct current (DC) power supply in the prior art. Referring to that Figure, an alternating current (AC) power supply 1 is connected to an AC/DC converter 2 at input terminals 6 and 7. The AC/DC converter is conventionally used for converting an alternating current provided by the AC power supply 1 into a direct current at output terminals 8 and 9. A power failure detector circuit 3 is connected across the input terminals 6 and 7 and is operative to detect the absence of a signal across those terminals, indicating a power failure of the AC power supply. If a power failure is detected, a detector signal 4 is output by the power failure detector circuit 3. The detector signal 4 is provided directly to an output terminal 13 and to a delay circuit 5, which delivers a delayed detector signal 12a to an input of OR gate 12 a predetermined period of time after the power failure detector signal 4 has occurred. A load 10 is connected across the output terminals 8 and 9 of the AC/DC converter 2, as is a DC low voltage output detector circuit 11 for detecting a reduction of an output voltage of the AC/DC converter 2 below a threshold value and generating an alarm signal 12b. Alarm signal 12b forms a second input to OR circuit 12, which provides an output signal 12c to output terminal 14 whenever there is either an output of the delay circuit 5 or an output of the DC output low voltage detector circuit 11. Signal 12c is used as a reset signal for starting a power-failure processing operation of the electronic circuit connected as the load 10.

Referring now to the operation timing charts in FIGS. 5 and 6, both charts illustrate operations of the DC power supply device of the prior art. FIG. 5 shows operation timing at the occurrence of a power failure in the AC power supply 1 when the current flowing in the load 10 is small (hereinafter referred to as "under light load"). In FIG. 5, waveform A illustrates a voltage waveform output by the AC power supply 1, initially during normal operation and then after the occurrence of a power failure in the AC power supply 1, at a time identified by time point 102. Waveform C illustrates the waveform output from the power failure detector signal 4, appearing at terminal 13, which is inactive before a power failure occurs in the AC power supply 1 and is active after a time point 104, which occurs a time period T1 after the power failure has occurred at time point 102. The delay T1 occurs because of the inherent signal delay provided by components in detector circuit 3. Waveform D illustrates the waveform of the reset signal 12c, appearing at terminal 14. This signal is inactive until time point 106, which occurs a preset time delay T2 after the occurrence of time point 104, and is active after the time point 106. For all practical purposes, T1 and T2 are fixed periods of time. Waveform B illustrates the output voltage waveform of the AC/DC converter 2. In the case illustrated in FIG. 5, since the current flowing in the load 10 is small, the DC output voltage of the AC/DC converter 2 is maintained by the charge stored in a capacitor (not illustrated) provided inside the AC/DC converter 2 and is not immediately reduced. The reset signal D at the time point 106 actually occurs before the DC output drops. The reduction is first identifiable later, when a voltage threshold is crossed at time point 108, after a time period T3 has elapsed. Thus, the detector circuit 11 first detects a reduction of the output voltage of the AC/DC converter 2 below the threshold level well after the power failure occurs. This delayed detection creates a problem when there is an instantaneous power failure, and the power returns to normal prior to an actual drop in DC output voltage. In such case, there is a possibility that a reset signal will be generated even if there is no existing problem due to the return of the power supply to normal.

FIG. 6 illustrates operation timing at the occurrence of a power failure in the AC power supply 1 when the current flowing in the load 10 is large (hereinafter referred to as "under heavy load"). The signals illustrated by waveforms A and C of FIG. 5 remain the same in this Figure. However, since the current flowing in the load 10 is large, the charge stored in the capacitor (not illustrated) provided inside the AC/DC converter 2 is immediately consumed. Thus, as illustrated in waveform B, the DC voltage at output terminals 8 and 9 is reduced and low voltage detector circuit 11 detects a reduction of the output voltage of the AC/DC converter 2 below a threshold value at a time point 109, prior to the time point 106 in FIG. 5. Application of this input to OR gate 12, prior to the input from delay circuit 5, causes the reset signal 12c to become active early. The accuracy of the DC output voltage detector circuit 11 is often insufficient, and in a conventional DC power supply device which produces a large range of output voltages at terminals 8 and 9 of the AC/DC converter 2, even a normal voltage may activate the low DC output voltage detector circuit 11 and be detected as a fault. In order to prevent a normal voltage from being detected as a fault, the prior art sets the fault detection threshold voltage level of the DC voltage detector circuit 11 at a value lower than the nominal operating voltage level of a circuit element used in an electronic circuit connected to the load. Because the threshold under these conditions is set quite low, the operation of the electronic circuit lacks reliability when a power failure actually does occur.

The DC power supply device of the prior art, constructed as described above, has several disadvantages. As noted previously, when the DC power supply device is employed under light load, an unnecessary alarm signal may be generated at the occurrence of an instantaneous power failure which returns to normal prior to the occurrence of time point 108, when the output voltage of the AC/DC converter 2 is reduced below the threshold value. A further disadvantage is seen when the DC power supply device is used under heavy load and the threshold voltage is set quite low. In that case, an alarm signal is generated only after the output voltage has been reduced below the operational voltage of the electronic circuit connected to the load.

SUMMARY OF THE INVENTION

An object of the present invention is to provide a DC power supply device which outputs a power failure alarm signal immediately before any resulting decrease in the output voltage of an AC/DC converter, both under light load and under heavy load, when a power failure has occurred.

The DC power supply device of the present invention comprises an AC/DC converter for converting an alternating current output from an AC power supply into a direct current, a power failure detector for generating a power failure detector signal when a power failure has occurred in the AC power supply, and an alarm signal generating circuit responsive to the power failure detector signal for outputting an alarm signal, having a variable time delay set in accordance with the value of the load current of the AC/DC converter, directly after the power failure detector signal is generated.

The alarm signal generating circuit may be implemented with analog or digital components. With the present invention, a reset signal may be generated after a short delay for a large load and may be generated after relatively longer delays for medium and small loads.

DETAILED DESCRIPTION OF THE PREFERRED EMBODIMENT

Figure 1:
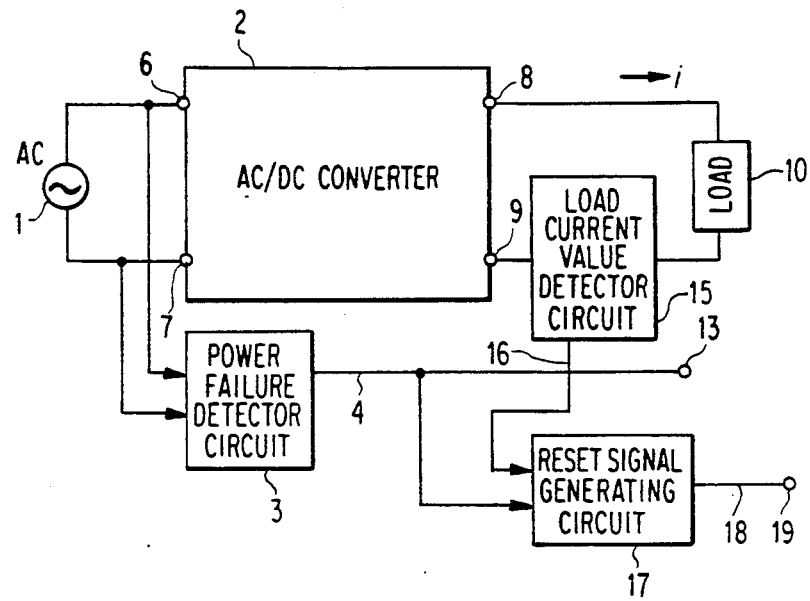
FIG. 1 is a block diagram of a DC power supply device according to an embodiment of the present invention.
Figure 4:
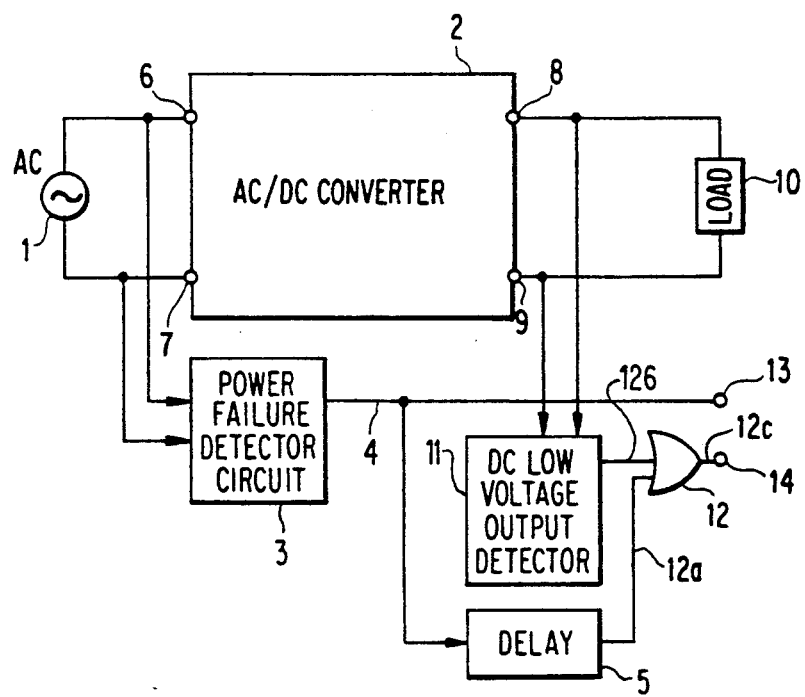
FIG. 4 is a block diagram of a DC power supply device in the prior art.

One embodiment of the present invention is described with reference to FIGS. 1 and 2. FIG. 1 is a block diagram, wherein the numerals 1 to 4, 6 to 10 and 13 indicate the same signals and components as in the prior art shown in FIG. 4. Referring to FIG. 1, an AC power supply 1 is connected at its output to an AC/DC converter 2 at its input terminals 6 and 7 and to a power failure detector 3. A load current value detector circuit 15 is connected to output terminal 9 of the AC/DC converter 2 and is used for detecting the value of the current flowing in the load 10. Circuit 15 outputs a load current value signal 16. A reset signal generating circuit 17 serves to generate an alarm signal in response to the power failure detector signal 4 and the load current value signal 16. The alarm signal is generated a variable period of time after the power failure detector signal 4 is generated. The length of the period is determined by the level of the load current value signal 16. The alarm signal appears as a reset signal 18 at reset signal terminal 19.

Figure 2:
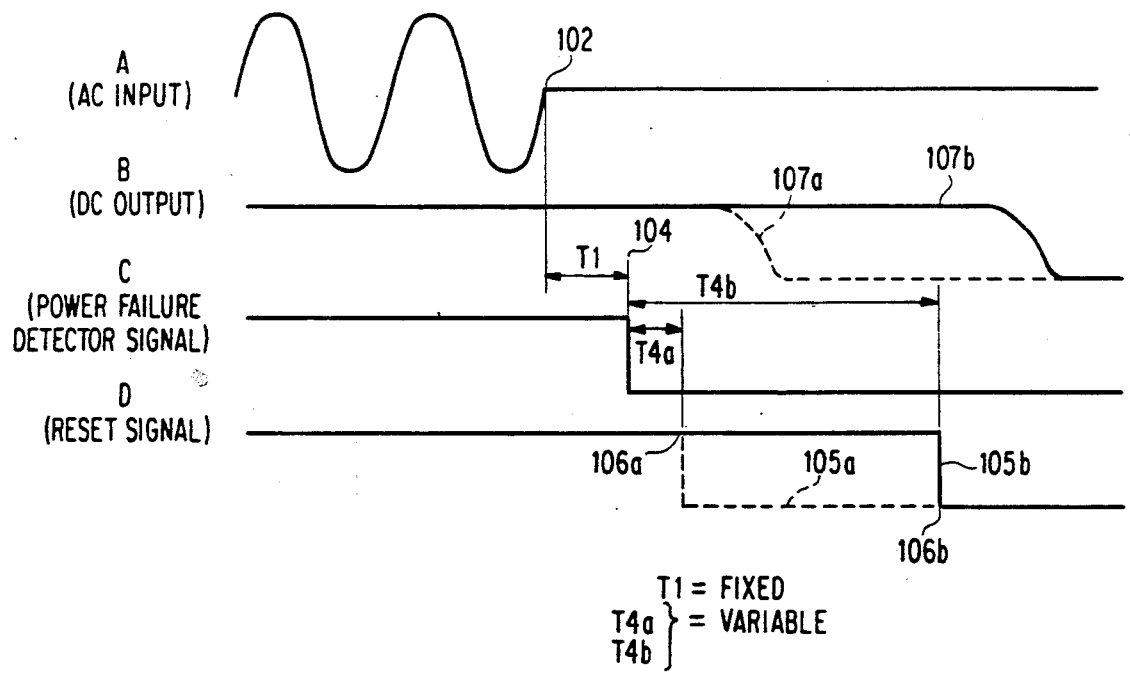
FIG. 2 is an operation timing chart of the DC power supply device shown in FIG. 1 at the occurrence of a power failure.
Figure 5:
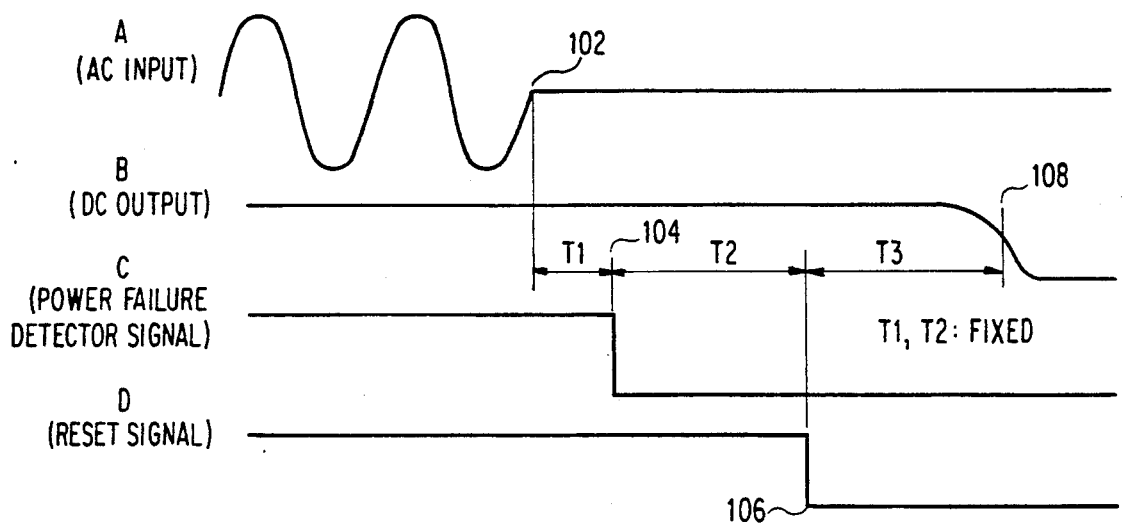
FIG. 5 is an operation timing chart of the DC power supply device shown in FIG. 4 at the occurrence of a power failure under light load.
Figure 6:
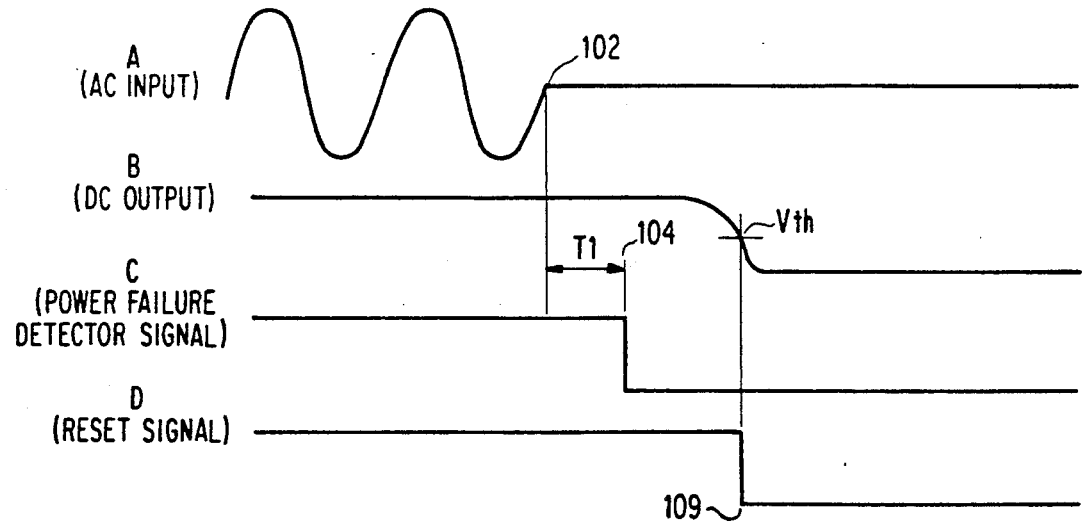
FIG. 6 is an operation timing chart of the DC power supply device shown in FIG. 4 at the occurrence of a power failure under heavy load.

FIG. 2 is an operation timing chart, wherein time points 102 and 104, waveforms A, B and C, and period T1 have the same meaning as in the prior art shown in FIGS. 5 and 6. Wave form D illustrates the voltage waveform of the reset signal 18. Portion 105a of waveform D shows the voltage waveform of the reset signal 18 under heavy load, having a knee beginning at time point 106a. Portion 105b of waveform D1 shows the voltage waveform of the reset signal 18 under light load, having a knee beginning at time point 106b. Referring to waveform B, it can be seen that portion 107a shows the voltage waveform of the output signal of the AC/DC converter 2 under heavy load. Also in waveform B, portion 107b shows the voltage waveform of the output signal of the AC/DC converter 2 under light load. When a power failure occurs at point 102 of waveform A, a period of time T1 passes before the power failure detection signal is activated at point 104 of waveform C. Following activation of the power failure detector signal, where there is a heavy load, a short length of time T4a passes until the reset signal 18 becomes active, as seen in waveforms C and D. When there is a light load, a long length of time T4b passes until the reset signal 18 becomes active, after the AC power supply power failure signal 4 has become active at point 104.

As an example of the operation of a preferred embodiment of the present invention, the reset signal generating circuit 17 in FIG. 1 activates the reset signal 18 at different times, depending on the level of the load current i, as detected by load current value detector circuit 15 and represented by the load current value signal 16 output by circuit 15. When the load current i is small, the generating circuit 17 makes the reset signal 18 active a long period of time after the power supply power failure signal 4 has become active.

Referring to FIG. 2, the length of time until the output voltage waveform 107a of the AC/DC converter 2 drops, after the power failure detector signal 4 has become active, will vary between a duration T4a for heavy loads and T4b for light loads. As subsequently described, the length of time can be varied, preferably in several steps, between the values for light and heavy loads depending upon the gradations in load to which circuit 17 is sensitive.

Figure 7:
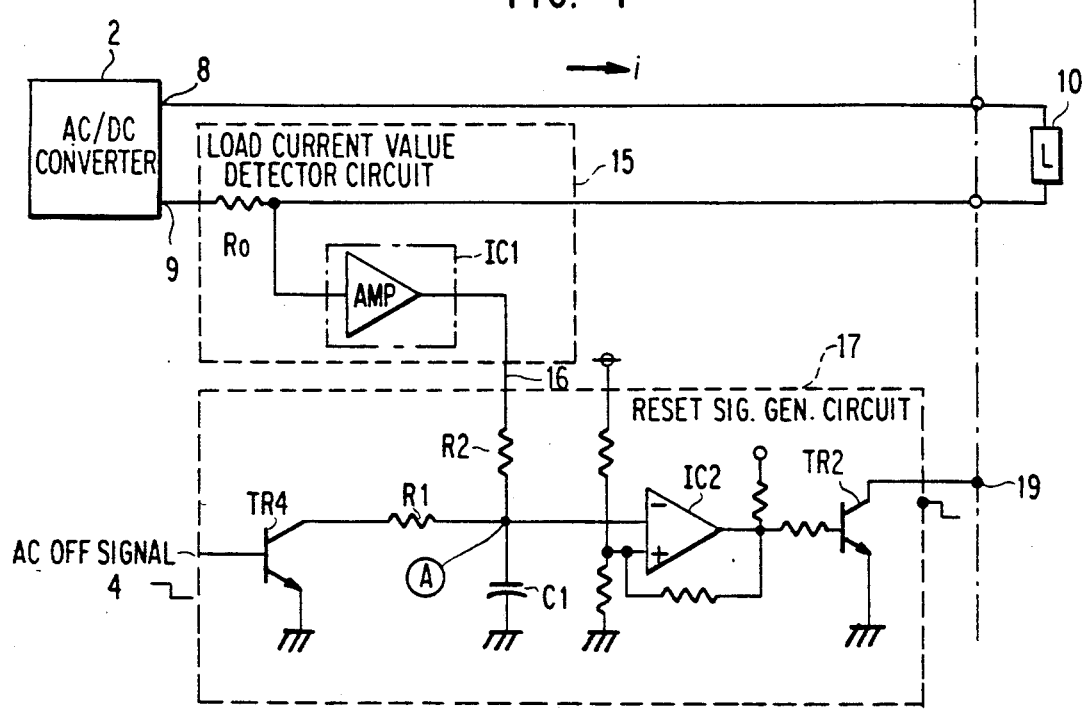
FIG. 7 is an analog implementation of the reset signal generating circuit.

An example of the specific structure and operation of the reset signal generating circuit 17 may be seen in FIG. 7. The output from the AC/DC converter 2 is connected to load 10, as in FIG. 1. The load current value detector circuit 15 comprises resistor R0 connected between one terminal of load 10 and output terminal 9 of the converter 2. A voltage in proportion to the current i is generated by the resistor R0 in the load power line. An amplifier IC1, connected at the load end of resistor R0, amplifies the voltage and provides it as an output on line 16. The output placed on line 16 by amplifier IC1 is a voltage that is inversely proportional to the load. The reset signal generating circuit 17 receives the signal on line 16 as well as a signal on line 4 from the conventional power failure detector circuit 3. The output from the operational amplifier on line 16 is connected via resistor R2 to junction point A. Also connected to this junction point is one terminal of a capacitor C1, whose opposite terminal is connected to ground. During ordinary operation, capacitor C1 is charged by the voltage output of operational amplifier IC1, thereby raising the voltage at junction A over a period of time. A third element connected to junction point A is operational amplifier IC2, which has a given threshold voltage level set in a manner known in the art. The output of IC2 is connected to the base of a transistor TR2, whose emitter is connected to ground and whose collector is connected to reset terminal 19. Finally, as previously noted, the output from the power failure detector circuit 3 on line 4, indicating that the AC signal is off, is input to the base of transistor circuit TR4. The emitter of transistor TR4 is connected to ground and its collector is connected via resistor R1 to junction point A.

In operation, when a power failure is detected by circuit 3, an AC off detection signal 4 is applied to the base of transistor TR4. As a result, the transistor is switched "on" and capacitor C1 is discharged as a result of the voltage generated across resistor R1. The capacitor discharge characteristic will depend upon the output voltage of operational amplifier IC1. Accordingly, the period of time required for the threshold level of IC2 to be reached will depend upon the level of the output signal across the load.

Figure 8:
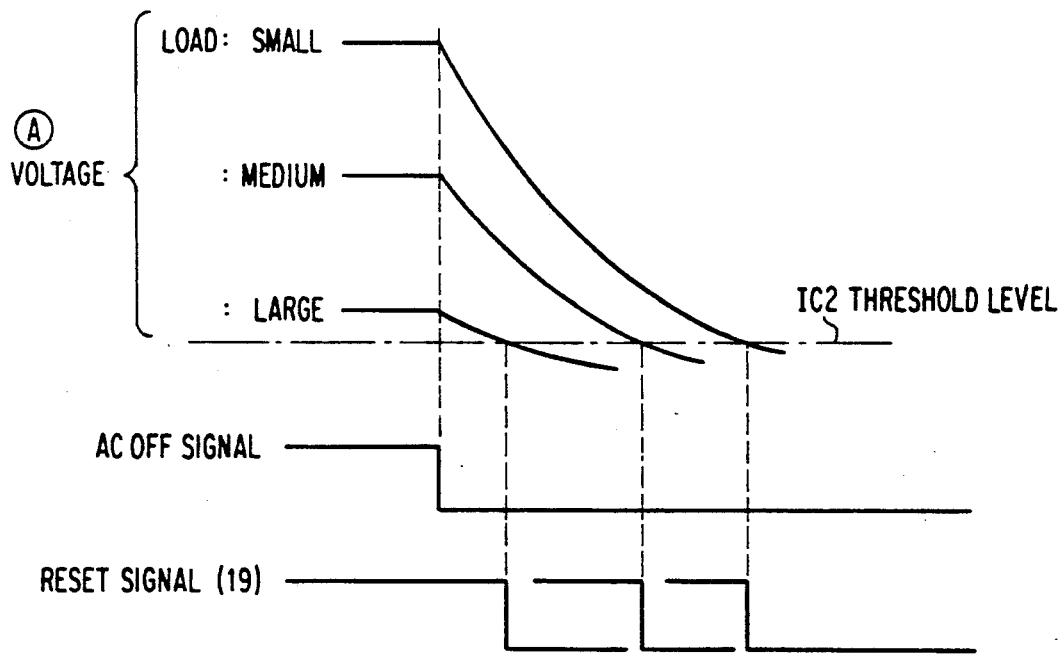
FIG. 8 is an operation timing chart of the reset signal generating circuit for small, medium and large loads.

FIG. 8 illustrates the operation of the reset signal generating circuit in FIG. 7 for a variety of loads. Since the voltage at point A will vary inversely with the size of the load, a small load will result in the storage of a large voltage by capacitor C1 and a large load will result in the storage of a small voltage by the capacitor. When an AC off signal 4 is generated as a result of the failure of the power supply, the capacitor C1 begins to discharge and the voltage at point A decreases. When the voltage at point A reaches the threshold level of operating amplifier IC2, the amplifier generates an output which appears as reset signal 19. As seen in FIG. 8, this signal will appear at different times after the AC off signal 4 is generated, depending upon the load served by the DC power supply device.

Clearly, the above circuit is designed to generate an alarm signal with a time delay set in accordance with the load current value of the AC/DC converter when detecting a power failure of the AC power supply. When a power failure is detected and, shortly afterward, normal power is resumed, before the capacitor C1 is discharged to the threshold level of the operational amplifier IC2, the power "off" signal is removed. The capacitor C1 stops discharging and begins to recharge. Thus, the threshold of IC2 is not crossed and no reset signal is generated. In this manner the alarm signal is not generated when the output of the AC/DC converter is normal, even after a power failure has occurred.

Figure 3:
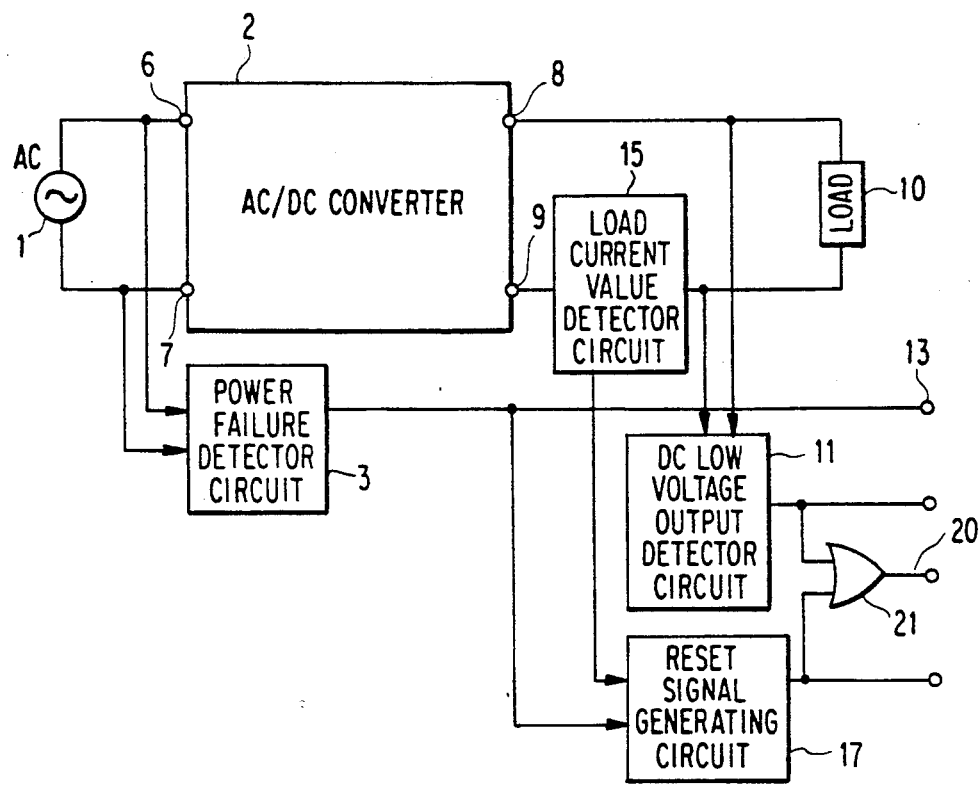
FIG. 3 is a block diagram of a DC power supply device according to an alternate embodiment of the present invention.

In order to increase the reliability of operation, as shown in FIG. 3, a signal obtained by an OR connection of an output of a low DC output voltage detector circuit 11 and an output of the reset signal generating circuit 17 may be used. In this embodiment, OR circuit 21 may be used to provide the reset signal 20. At the occurrence of an ordinary power failure, this embodiment performs the same operations and produces the same effect as that illustrated in FIG. 1. However, at the occurrence of an output fault of the AC power supply 1, if the reset signal generating circuit 17 does not generate the reset signal for some reason, the embodiment generates the reset signal 20 by means of the low DC output voltage detector circuit 11.

Figure 9:
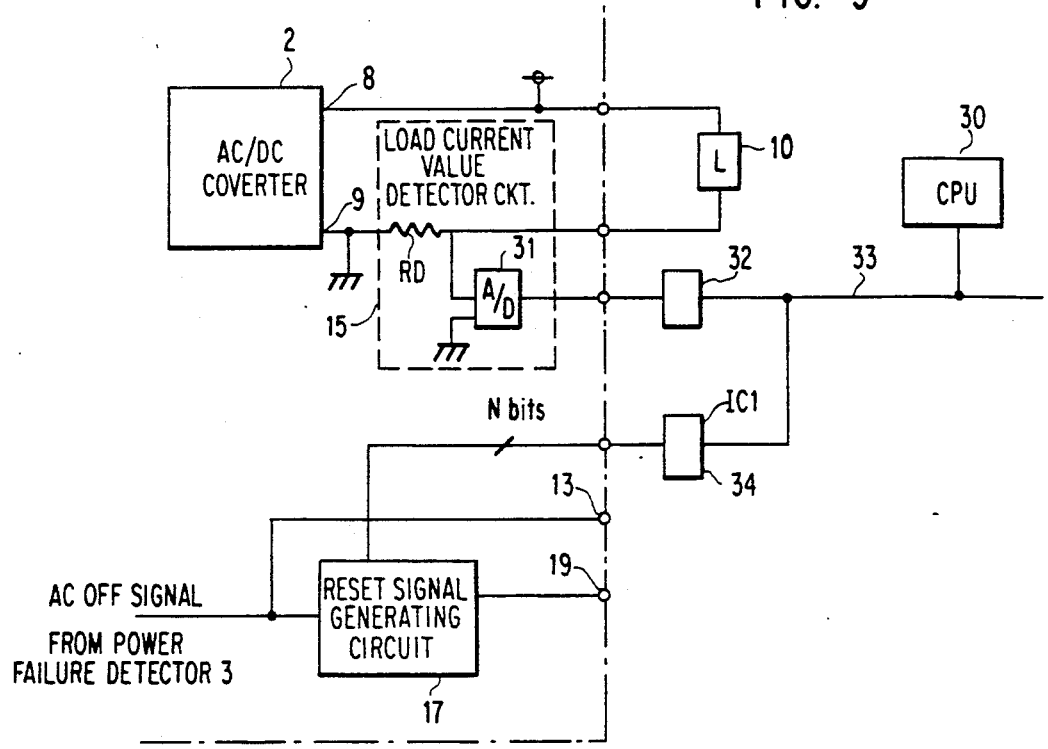
FIG. 9 is a block diagram of a digital implementation of the reset signal generating circuit.

A further embodiment of the invention is seen in FIG. 9, using a digital architecture for the load current value detector circuit 15 and the reset signal generating circuit 17. As in FIG. 7, the load current value is detected by resistor R0 and the voltage value is converted by an A/D converter circuit 31, whose output is connected to a CPU 30 via I/O buffer 32 and bus 33. The CPU 30 knows the digital value of the load current i by virtue of the output of analog to digital converter 31. The CPU is responsive to this digital value and stores an appropriate digital value in the output latch 34, identifying the load current value. The output from latch 34, which may be flip-flop-based, provides N bits of information to the reset signal generating circuit 17, where N is the number of bits used to represent the variable load current levels.

Figure 10:
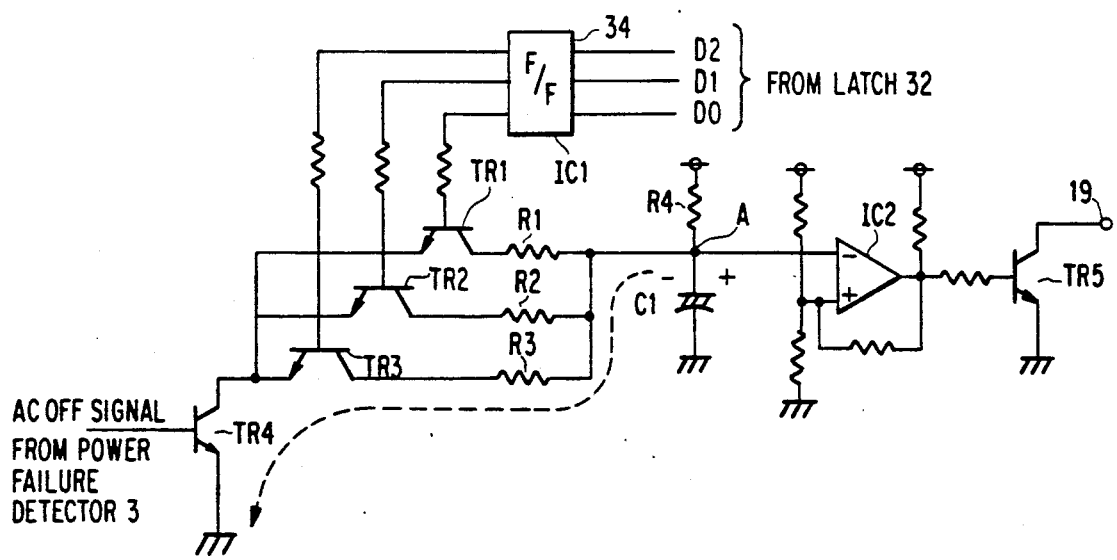
FIG. 10 is an embodiment of a reset signal generating circuit used in a digital implementation of the invention.

FIG. 10 shows the reset signal generating circuit 17 in greater detail, as connected to the output of latch 34, the output of power failure detector circuit 3 and reset terminal 19. The circuit comprises three transistors TR1, TR2, TR3, each of which has its base connected to receive a respective one of N output bits from latch 34, identifying whether the load is high, low or inbetween, where N in this case equals 3. (The use of 3 bits allows seven levels of load variation to be represented.) The circuit also comprises a transistor TR4, connected in a manner similar to that of the embodiment of FIG. 7 and having its collector connected to the emitter of each of transistors TR1, TR2 and TR3. A junction point A connects together one terminal of capacitor C1, the input to operational amplifier IC2 and the resistors R1, R2 and R3 that are in series with the collector terminals of transistors TR1, TR2 and TR3, respectively.

In operation, the CPU will provide a digital signal (D0, D1, D2) to latch 34, identifying whether the load current is high, low or inbetween. The bits in the latch will turn "on" a respective one or ones of transistors TR1, TR2 and TR3, thereby opening a path or paths between charged capacitor C1 and transistor TR4. When the AC source is "off", the AC "off" signal 4 is entered at the base of transistor TR4, which then conducts and permits the charge in capacitor C1 to be discharged through transistor TR4 and one or more lines selected from among the three lines respectively containing resistors R1, R2 or R3 and transistors TR1, TR2 and TR3. As the capacitor C1 discharges through the selected line or lines, the negative input of the comparator IC2 changes at a rate dependent on the value of the resistor R1, R2 or R3 (or parallel combination thereof) selected by the energization of one (or more) of the transistors TR1, TR2 and TR3.

For example, if TR1-TR3 are all "on", the reset signal 19 may be switched low immediately. If any one or two of TR1-TR3 is "on", the reset signal is switched low after a variable delay. The effective discharge resistance can thus be divided into multiple stages according to the value of the consumed current. As mentioned, three bits (D0, D1, D2) allows the discharge resistance to take seven possible different values.

Figures 11, 12:
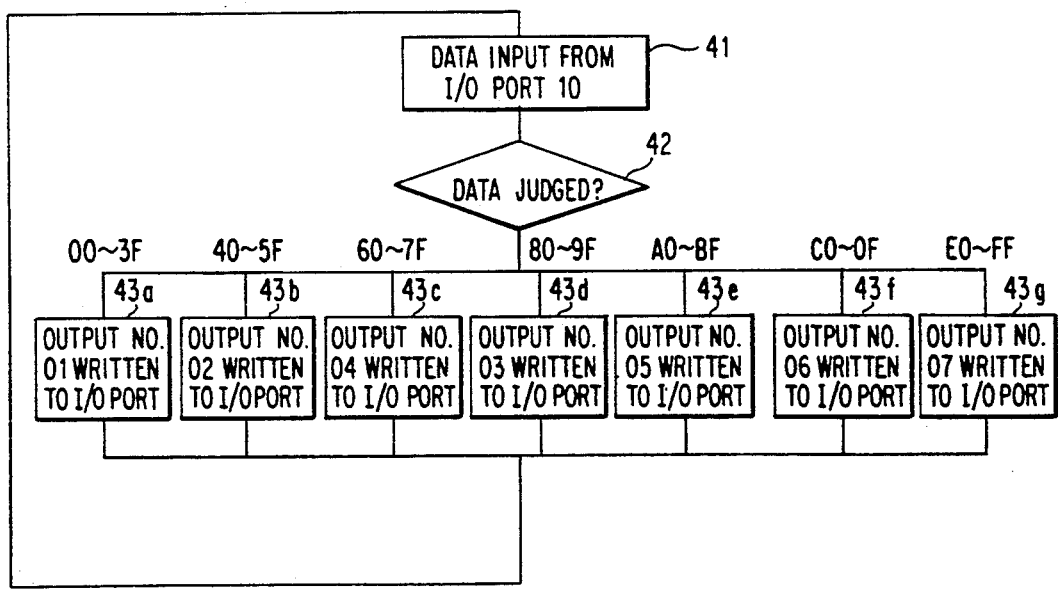
FIG. 11 is a Table summarizing the digital signal and circuit connections used for a variety of load conditions.
FIG. 12 is a flow chart of a program implemented in a digital embodiment of the invention for determining the configuration of an appropriate delay circuit for varying load conditions.

An example of the signals used in seven-stage operation, employing the circuit of the embodiment of FIGS. 9 and 10, is seen in FIG. 11. In the chart, the seven load conditions (1-7) are shown along the top horizontal portion of the chart and represent the load current, varying from a small value (condition 1) to a large value (condition 7). The data at the output of buffer 32 is seen in horizontal line C of the Figure in hexadecimal notation. The output representing each of these load ranges, as it appears at buffer 34, is represented in row D as binary signals D0–D2. The combination of discharge resistors selected in response to each of the load ranges is shown in row E of the Figure and the corresponding delay of the reset signal, varying from a long duration to a short duration, is seen in row F.

FIG. 12 shows a flowchart which represents the operation of the CPU 30 in response to data input from the A/D converter. The data is input at step 41, and is then judged at step 42. Depending upon the value of the input data, seen in hexadecimal notation corresponding to line C of FIG. 11, a particular value corresponding to line D of FIG. 11 is written to the input of latch 34, as seen in steps 43a–43g. The binary data which would appear at the output of latch 34 controls the operation of reset signal generating circuit 17, in accordance with the structure of FIG. 10.

While specific analog and digital embodiments of the present invention have been shown, modifications of this circuitry would be known ad understood by one of ordinary skill in the art.

For example, the load current value signal 16 that is detected by the load current detector circuit 15 in the preferred embodiments of the invention may be generated in accordance with the setting of a switch or the like, if it is a known predetermined value, and may be given to the reset signal generating circuit 17.

It also will be appreciated further that when the preferred embodiment will be connected to one or a plurality of loads selectively, from among various units of known current consumption, the load current value signal 16 may be generated in accordance with a sum calculated by a processor (not illustrated) using prestored current consumption values for each of the various units, and may then be provided to the reset signal generating circuit 17.

What is claimed is:

1. A DC power supply device operative to supply DC power to a load in response to an AC power source, said device comprising:

AD/DC converting means connected to receive AC power from said AC power source for converting an AC current into a direct current;

power failure detecting means, responsive to said AC power source, for generating a power failure detection signal when a power failure has occurred in said AC power supply;

means for detecting a load current value at the output of said AC/DC converting means; and alarm signal generating means responsive to said power failure detector signal and said detected load current value for outputting an alarm signal after a delay time determined in accordance with said detected load current value in such a way that said alarm signal is output immediately before said load current value decreases due to the power failure.

2. The DC power supply device of claim 1 wherein said delay time is inversely related to said load current value.

3. The DC power supply device of claim 1 wherein said alarm signal is a reset signal for said load.

4. The DC power supply device of claim 1 wherein said alarm signal generating means comprises a voltage storage means, and switching means connected between said voltage storage means and ground and responsive to said power failure detector signal, for discharging the voltage in said voltage storage means.

5. The DC power supply device of claim 1 further comprising:

means for detecting a voltage below a predetermined threshold at the output of said AC/DC converting means and for generating a low output voltage signal, and logic circuit means responsive to said low output voltage signal or said alarm signal for generating a reset signal.

6. The DC power supply device of claim 1 wherein said alarm signal generating means comprises a voltage storage means and means for comparing the level of voltage stored in said voltage storage means with a predetermined voltage level.

7. The DC power supply device of claim 6 wherein said load current detecting means comprises a resistor and an amplifier means.

8. The DC power supply device of claim 6 wherein said voltage storage means comprises a capacitor and said means for comparing comprises an operational amplifier.

9. The DC power supply device of claim 7 wherein said amplifier means provides an output having a value varying inversely with respect to the magnitude of said load current.

10. A DC power supply device operative in response to an AC power source to provide DC power to a load, said device comprising:

an AC/DC converter, connected to receive AC power from said AC power source, for converting an AC current into a direct current; and reset signal generating means, responsive to a failure of said AC power source and to a DC load current level produced by said AC/DC converter for outputting a reset signal after a delay time determined in accordance with said DC load current level in such a way that said reset signal is output immediately before said load current value decreases due to the power failure.

11. The DC power supply device of claim 10 wherein said reset signal generating means comprises:

a voltage storage means for storing a voltage;

first means for detecting said DC load current level and generating a digital signal representative of said level; and second means responsive to said digital signal and a power failure in said AC power supply for variably controlling the discharge rate of said voltage storage means.

12. The DC power supply device of claim 11 further comprising:

means responsive to the voltage stored in said voltage storage means for signalling that the voltage stored is equal to a predetermined value.

13. The DC power supply device of claim 12 wherein said reset signal generating means operates under the control of a CPU.

* * * * *